(12) United States Patent
Mulle (10) Patent No.: US 6,968,984 B2
(45) Date of Patent: Nov. 29, 2005

(54) THERMAL CONTAINER (75) Inventor: Theodore B. Mulle, New Milford, CT (US)

(73) Assignee: Conair Corporation, Stamford, CT (US)

( * ) Notice: Subject to any disclaimer, the term of this patent is extended or adjusted under 35 U.S.C. 154(b) by 141 days.

(21) Appl. No.: 10/337,953

(22) Filed: Jan. 7, 2003

(65) Prior Publication Data
US 2003/0192918 A1 Oct. 16, 2003

Related U.S. Application Data (60) Provisional application No. 60/347,309, filed on Jan. 10, 2002, provisional application No. 60/367,137, filed on Mar. 22, 2002.

(51) Int. Cl.[7] .............................................. A47G 19/14
(52) U.S. Cl. ............................. 222/475.1; 222/481.5; 222/500
(58) Field of Search .......................... 222/465.1, 468, 222/469, 475, 475.1, 481.5, 500

(56) References Cited

U.S. PATENT DOCUMENTS

| | | | |
|---|---|---|---|
| 2,991,897 A * | 7/1961 | Burnett ........................ | 215/21 |
| 3,779,429 A | 12/1973 | Porcelli ....................... | 222/500 |
| 4,344,549 A | 8/1982 | Paradis et al. ............... | 222/465 |
| 4,386,556 A | 6/1983 | Romey, Sr. .................. | 99/290 |
| 4,482,083 A | 11/1984 | Beck ........................... | 222/500 |
| 4,739,898 A | 4/1988 | Brown ........................ | 220/203 |
| 4,924,922 A | 5/1990 | Johnson ....................... | 141/346 |
| 4,930,687 A | 6/1990 | Brindopke et al. .......... | 222/475 |
| 4,997,015 A | 3/1991 | Johnson ....................... | 141/346 |
| 5,038,959 A | 8/1991 | Patel ........................... | 220/366 |
| 5,110,016 A | 5/1992 | Heimann et al. ........... | 222/475.1 |
| 5,379,925 A | 1/1995 | Mothrath et al. .......... | 222/475.1 |
| 5,480,054 A | 1/1996 | Midden ....................... | 220/202 |
| 5,653,362 A | 8/1997 | Patel ........................... | 222/156 |
| 5,699,719 A | 12/1997 | Lucas et al. ................ | 99/299 |
| D389,369 S | 1/1998 | Hippen ........................ | D7/319 |
| D411,404 S | 6/1999 | Littmann ..................... | D7/319 |
| 5,911,345 A | 6/1999 | Castleberry ................. | 222/482 |
| D414,071 S | 9/1999 | Mork et al. .................. | D7/319 |
| 5,957,036 A | 9/1999 | Warner et al. ............... | 99/299 |
| 5,968,618 A | 10/1999 | Miller ......................... | 428/34.6 |
| 5,988,457 A | 11/1999 | Andrew et al. ............. | 222/475.1 |
| D419,028 S | 1/2000 | Mork et al. .................. | D7/321 |
| 6,085,946 A * | 7/2000 | Hirsch et al. ............... | 222/475.1 |
| D442,014 S | 5/2001 | Haring et al. ............... | D7/319 |
| 6,481,601 B1 * | 11/2002 | Steen .......................... | 222/500 |
| 2003/0136803 A1 * | 7/2003 | Kuwano et al. ........... | 222/481.5 |

* cited by examiner

Primary Examiner—Joseph A. Kaufman
(74) Attorney, Agent, or Firm—Lawrence Cruz; Steven A. Garner (57) ABSTRACT

A container is provided. The container has a cover that remains thermally, sealingly engaged with the container during the filling and dispensing of the container, and has filling and dispensing channels that are thermally sealed when not in use.

10 Claims, 7 Drawing Sheets

THERMAL CONTAINER

RELATED APPLICATIONS

This application is related to, and claims priority in, co-pending U.S. Provisional Application Ser. No. 60/347,309, filed Jan. 10, 2002 and co-pending U.S. Provisional Application Ser. No. 60/367,137, filed Mar. 22, 2002, the disclosures of which are incorporated herein by reference.

BACKGROUND OF THE INVENTION

1. Field of the Invention

The present invention relates to one or more containers. More particularly, the present invention relates to one or more thermally insulated containers.

2. Description of the Prior Art

Automatic drip brewing devices are known in the art. These devices require an open passage that allows the brewed beverage to flow from the brewing device to the container and an open passage for dispensing the brewed beverage from the container. However, the open passage also allows unwanted heat loss, typically by steam passing back through the open passage.

The present invention relates to an improved container that substantially eliminates heat loss through the open passage. The present invention provides a container with a cover that remains thermally, sealingly engaged with the container during the filling and dispensing of the container, and provides for filling and dispensing channels that are thermally sealed when not in use.

SUMMARY OF THE INVENTION

It is an object of the present invention to provide a container.

It is another object of the present invention to provide such a container that is thermally insulated.

It is still another object of the present invention to provide such a container that has a cover that is thermally, sealingly engaged and remains on the container.

It is a further object of the present invention to provide such a container that allows filling and dispensing of a substance without removal of the cover.

It is still a further object of the present invention to provide a container that substantially eliminates heat loss by allowing the filling and dispensing of the container through filling and dispensing channels that are thermally sealed when not in use.

These and other objects and advantages of the present invention are achieved by a container having a lid that remains thermally, sealingly engaged with the container during the filling and dispensing of the container, and has filling and dispensing channels that are thermally sealed when not in use. The filling channel is thermally sealed using a floating ball, and the dispensing channel is thermally sealed using a rolling ball. Also, the dispensing channel can be thermally sealed using a flat, pivoting valve that opens under the force of gravity.

The present invention provides a container having a body defining an inner volume; a handle that can be secured to the body; a lid that can be sealingly secured to the body; a passageway formed in the body, the lid or both, and connected between the inner volume and atmosphere; and a valve operably connected to the passageway. The valve provides either fluid communication between the inner volume and the atmosphere through the passageway or fluid isolation between the inner volume and the atmosphere through the passageway. The valve also operates without manual actuation.

The present invention also includes a container having a body defining an inner volume; a handle that can be, and preferably is, secured to the body; a lid that can be sealingly secured to the body; a first passageway formed in the body, the lid or both, and connected between the inner volume and atmosphere; a first valve operably connected to the first passageway; a second passageway formed in the body, the lid or both, and connected between the inner volume and the atmosphere; and a second valve operably connected to the second Passageway. The first valve provides either fluid communication between the inner volume and the atmosphere through the first passageway or fluid isolation between the inner volume and the atmosphere through the first passageway. The second valve provides either fluid communication between the inner volume and the atmosphere through the second passageway or fluid isolation between the inner volume and the atmosphere through the second passageway. Also, the first and second valves operate without manual actuation.

The present invention additionally includes a container having a body defining an inner volume; a lid that can be sealingly secured to the body; a filling channel formed or provided in the lid and connected between the inner volume and atmosphere; a filling valve operably connected to the filling channel; a dispensing channel formed or provided in the lid and connected between the inner volume and the atmosphere; and a dispensing valve operably connected to the dispensing channel. The filling valve has an actuated position that provides fluid communication between the inner volume and the atmosphere through the filling channel and a non-actuated position that provides fluid isolation between the inner volume and the atmosphere through the filling channel. The dispensing valve has an actuated position that provides fluid communication between the inner volume and the atmosphere through the dispensing channel and a non-actuated position that provides fluid isolation between the inner volume and the atmosphere through the dispensing channel. The filling valve is actuated by the liquid being filled into the inner volume and the dispensing valve is actuated by tilting of the container.

The lid can have a retaining ring and a cover. The retaining ring can be secured to the body and the cover can be selectively secured to the retaining ring. The filling and dispensing channels can be formed through the cover. The cover can be threadingly secured to the retaining ring. The valves can be actuated by gravity when the container is tilted. The valves can be floating balls. The container can also have a guiding member, in which the valves are slidably connected to the guiding member to allow only substantially linear movement of the valves. The container can additionally have a vent that provides fluid communication between the inner volume and the atmosphere independent of actuation of the valves. The body can have an inner wall and an outer wall with a space or vacuum disposed between the walls.

The dispensing valve can have a sealing member that is pivotally secured adjacent to the dispensing channel. The dispensing valve can be movable between the actuated position in which the sealing member unseals the dispensing channel and the non-actuated position in which the sealing member seals the dispensing channel. The sealing member can be substantially flat. The body can have a longitudinal axis, and the filling channel can have a first end with a first opening and a second end with a second opening. The first opening can be disposed farther away from the longitudinal axis than the second opening. The container can have a spout in fluid communication with the dispensing channel. The spout can be disposed on the retaining ring.

DETAIL DESCRIPTION OF THE INVENTION

Figure 1:
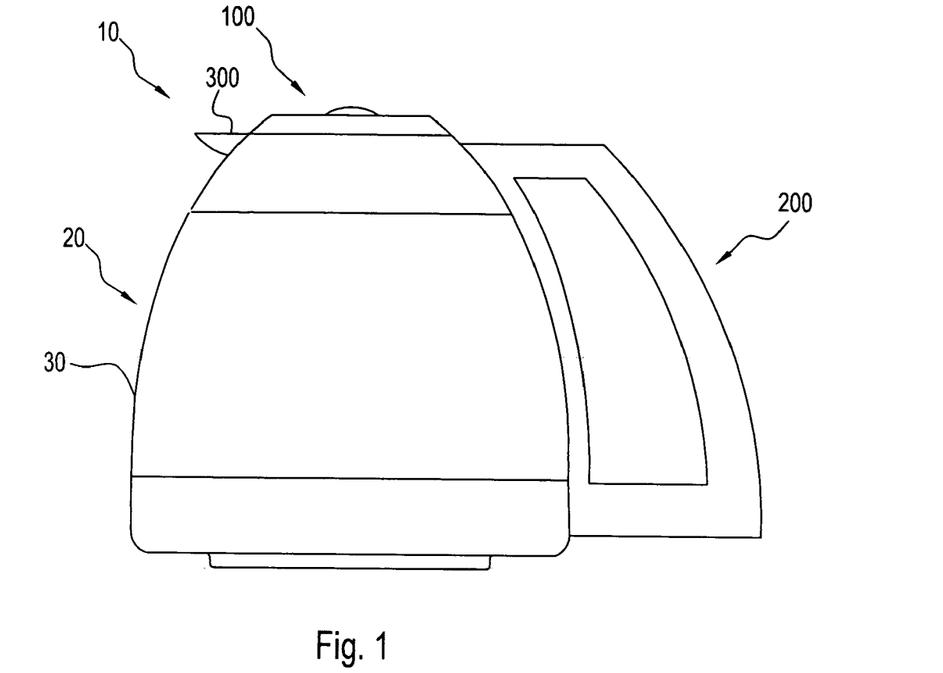
FIG. 1 is a side view of a container of the present invention.
Figure 2:
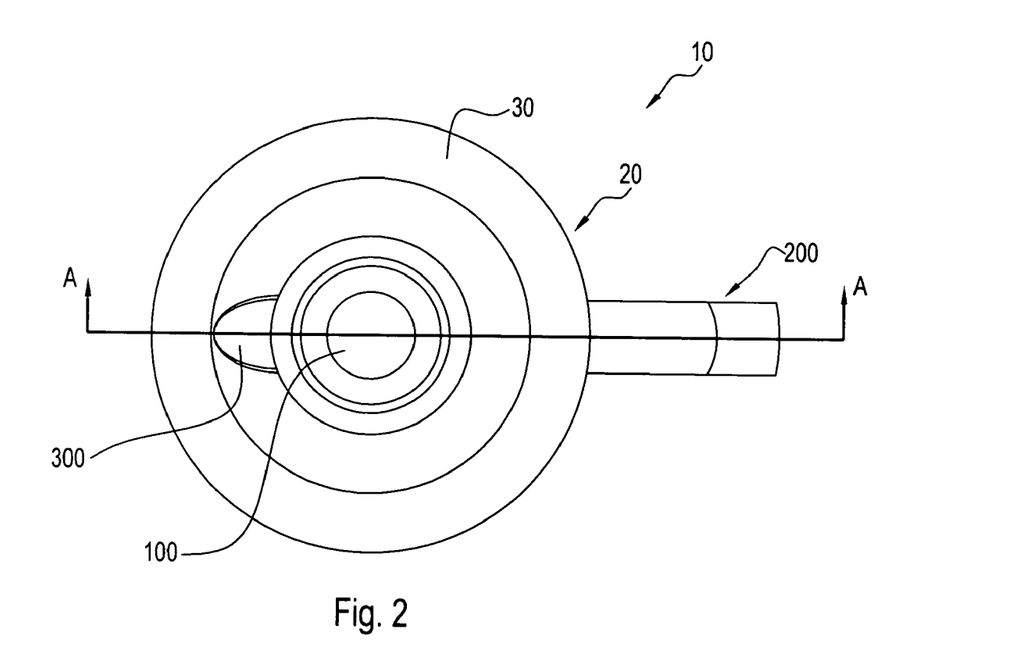
FIG. 2 is a top view of the container of FIG. 1.

Referring to the figures and, in particular, to FIGS. 1 and 2, there is provided a container generally represented by reference numeral 10. Container 10 has a body 20, a lid 100 that can be removably secured to the body, and a handle 200 that is preferably secured to the body.

Figure 3:
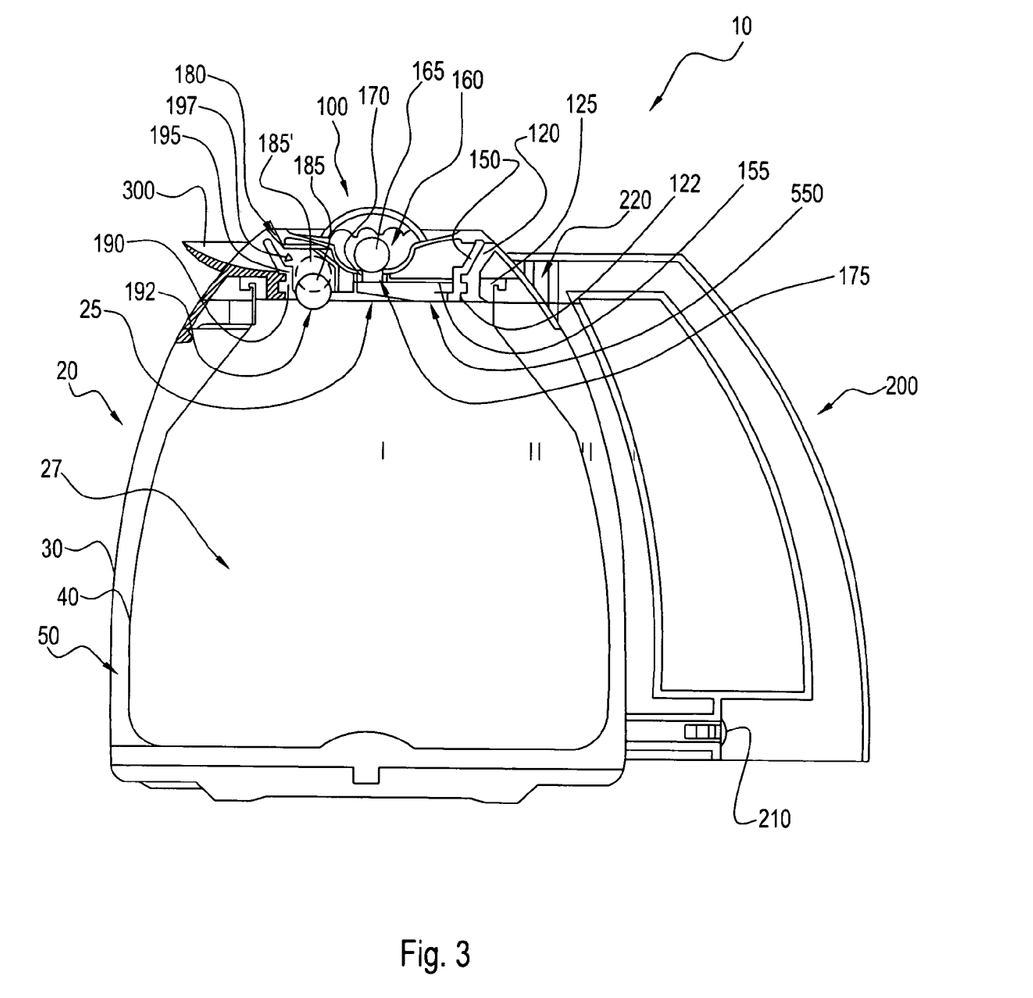
FIG. 3 is a cross-sectional view of the container of FIG. 1, taken along line A—A of FIG. 2.

Referring to FIGS. 1 and 3, body 20 is preferably substantially cylindrical in shape. Body 20 has an opening 25 through which a substance may enter and exit container 10. Preferably, body 20 has a hollow area or inner volume 27 of about 1.5 liters. However, the inner volume 27 can have a smaller or larger capacity. Opening 25 is preferably circular but can be other shapes depending upon the shape of body 20. Body 20 has an outer wall 30 and an inner wall 40. Outer wall 30 and inner wall 40 are separated to define therebetween a thermal space 50. Preferably, thermal space 50 provides a vacuum between outer and inner walls 30, 40 for improved thermal insulation of container 10. Outer and inner walls 30, 40 are preferably made of stainless steel. While this embodiment uses a double wall design, i.e., outer wall 30, inner wall 40 and thermal space 50, to provide thermal insulation to inner volume 27, alternative designs can also be used to thermally insulate container 10.

Lid 100 can allow a substance, in this example a brewed liquid such as coffee, to flow through the lid and into inner volume 27 of body 20 without removal of the lid. Lid 100 has a rim 120 and a cover 150. Rim 120 and inner wall 40 are configured and sized for sealing engagement. In the embodiment shown, rim 120 snap fits into sealing engagement with inner wall 40. A seal 125 is positioned between rim 120 and inner wall 40 to prevent any leakage of liquid or loss of heat. Preferably, seal 125 is a soft durometer gasket. Preferably, rim 120 and cover 150 are made from thermoplastic material.

Cover 150 is sealingly secured to rim 120 to prevent leakage and heat loss. Preferably, cover 150 is threadingly secured to rim 120 by threads on the exterior surface of cover 150, which mate with threads on the interior surface of opening 122 of the rim.

Cover 150 has a filling channel 160 and a dispensing channel 180. In the embodiment shown, separate channels 160, 180 are used for the filling and dispensing operations of container 10. However, a single channel can be used for the filling and dispensing operations of container 10. Also, more than two channels can be used for the filling and dispensing operations of container 10.

Preferably, filling channel 160 is substantially concave having an arcuate cup-like shape. However, filling channel 160 can have other shapes including frusto-conical. Filling channel 160 has a filling valve 165, a filling seat 170 and a filling hole 175. Preferably, filling valve 165 is a ball. Filling ball 165 has a specific gravity that allows it to float in filling channel 160 when a liquid, in this example a brewed substance such as coffee, is introduced into the filling channel. The concave or arcuate shape of filling channel 160 facilitates holding of the liquid as it is introduced into the filling channel and creates a slope for filling ball 165 to rest back upon filling seat 170 as described below. In this embodiment, one ball is used for filling valve 165. However, alternatively, a plurality of balls can also be used for filling valve 165, as well as a plurality of filling seats 170.

Preferably, filling ball 165 is made from plastic. When filling ball 165 floats, it is raised above filling seat 170. Thus, filling hole 175 is opened and the liquid flows through filling channel 160 into container 10. In this embodiment, filling hole 175 is substantially cylindrical in shape to facilitate the flow of the liquid from filling channel 160 through filling hole 175. Once all of the liquid is introduced into container 10, filling ball 165 will cease floating and will rest back upon filling seat 170 due to the concave or arcuate shape of filling channel 160 and gravity. Filling hole 175 has a diameter that is smaller than the diameter of filling ball 165 to prevent the filling ball from passing fully through the filling hole and to allow a sealing engagement. Preferably, filling ball 165 has the same or similar shape as filling seat 170 to allow a sealing engagement therebetween. This creates a sealing engagement of filling hole 175 that prevents heat loss through filling channel 160.

Container 10 further has a filling orifice 550 positioned downstream from filling hole 175. Preferably, filling orifice 550 is offset from filling hole 175 toward handle 200. Offsetting filling orifice 550 from filling hole 175 towards handle 200 minimizes the risk of any back flow of the liquid through filling channel 160 when container 10 is tilted for pouring.

Dispensing channel 180 has a dispensing valve 185, a lower seat 190, a lower hole 192, an upper seat 195, and an upper hole 197. Preferably, dispensing valve 185 is a ball. However, dispensing valve 185 can also be other one-way valves that prevent heat loss through dispensing channel 180. In this embodiment, one ball is used for dispensing valve 185. However, alternatively, a plurality of balls can also be used for dispensing valve 185. When container 10 is in an upright position, dispensing ball 185 rests on lower seat 190. Lower hole 192 has a diameter that is smaller than the diameter of dispensing ball 185 to prevent the dispensing ball from passing fully through the lower hole and to allow a sealing engagement. Preferably, dispensing ball 185 has the same or similar shape as lower seat 190 to allow a sealing engagement. In this embodiment, lower seat 190 has a circular shape that facilitates sealing engagement with the spherical shape of dispensing ball 185. This creates a sealing engagement of dispensing ball 185 and lower hole 192. Thus, heat loss through dispensing channel 180 is prevented.

Dispensing channel 180 preferably has an angled or sloped shape. When container 10 is tilted for pouring or dispensing of the liquid, dispensing ball 185 is dislodged from lower seat 192 and moves along angled or sloped dispensing channel 180 towards upper hole 197 due to gravity. Dispensing ball 185 rests upon upper seat 195 due to the shape of dispensing channel 180 and the force of gravity (the position of dispensing ball 185 is depicted by broken lines 185'). Upper hole 197 has a diameter that is smaller than the diameter of dispensing ball 185 to prevent the dispensing ball from fully passing through the upper hole. Upper hole 197 and upper seat 195 have a different shape than dispensing ball 185 to allow the liquid to flow around the periphery of the dispensing ball and through the upper hole. Upper hole 197 and upper seat 195 can have an elliptical shape that provides a gap about the periphery of the spherical dispensing ball 185. Thus, the liquid flows through dispensing channel 180 when container 10 is tilted.

Lid 100 preferably has a vent hole 155. However, alternative venting means may be utilized including positioning vent hole 155 along body 20. Vent hole 155 permits air to exit and enter container 10 during the filling and dispensing operations. Thus, vent hole 155 prevents container 10 from becoming air bound or creating an internal vacuum and hindering the transfer of the liquid. Significantly, lid 100 does not require any opening to fill container 10 or to dispense a substance from container 10.

Handle 200 facilitates lifting and pouring of container 10. Preferably, handle 200 extends vertically along outer wall 30. More preferably, handle 200 has a curved shape that is similar to the curvature of outer wall 30. Preferably, handle 200 is made from a thermoplastic material. In this embodiment, handle 200 is secured to body 20 by a screw 210 positioned at the bottom of the handle and a hook 220 positioned at the top of the handle. Rim 120 has a receptacle (not shown) for receipt and engagement with hook 220. Alternative positioning and securing methods for handle 200 can also be used, including providing removability of the handle or securing the handle to a different portion of container 10.

Container 10 also has a spout 300. Spout 300 is in fluid communication with dispensing channel 180 as shown clearly in FIG. 2 to facilitate and direct the liquid as it is poured from container 10.

Container 10 provides for thermal sealing of inner volume 27 without manual actuation of any valves, i.e., a user does not need to actuate any valve by hand in order to thermally seal the inner volume. Container 10 allows for filling or dispensing the contents of inner volume 27 while automatically thermally sealing the inner volume before and after the filling or dispensing operation. Lid 100 remains thermally, sealingly engaged with body 20 during either the filling or dispensing operation.

Figure 4:
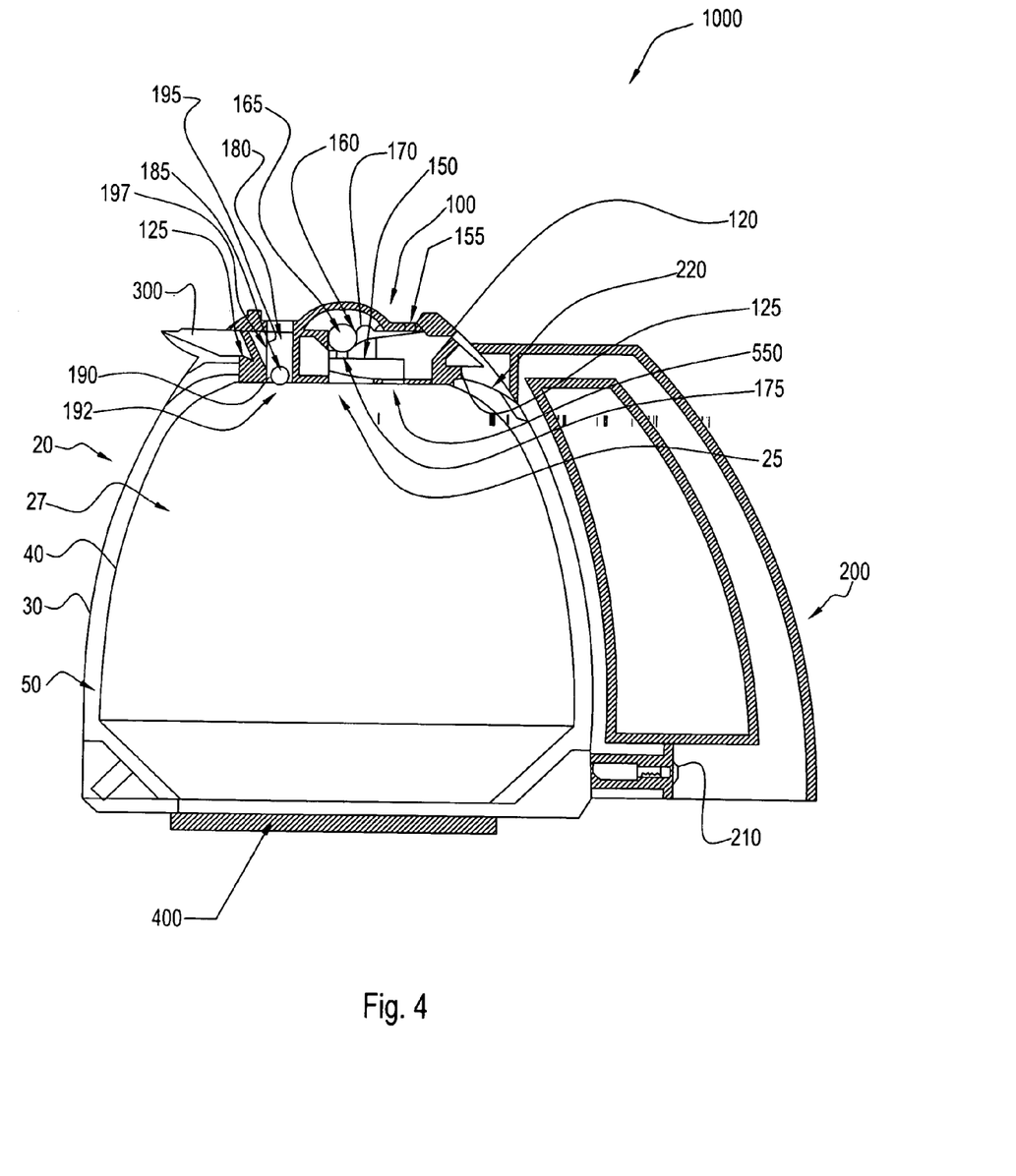
FIG. 4 is a cross-sectional view of an alternate embodiment of a container of the present invention.
Figure 5:
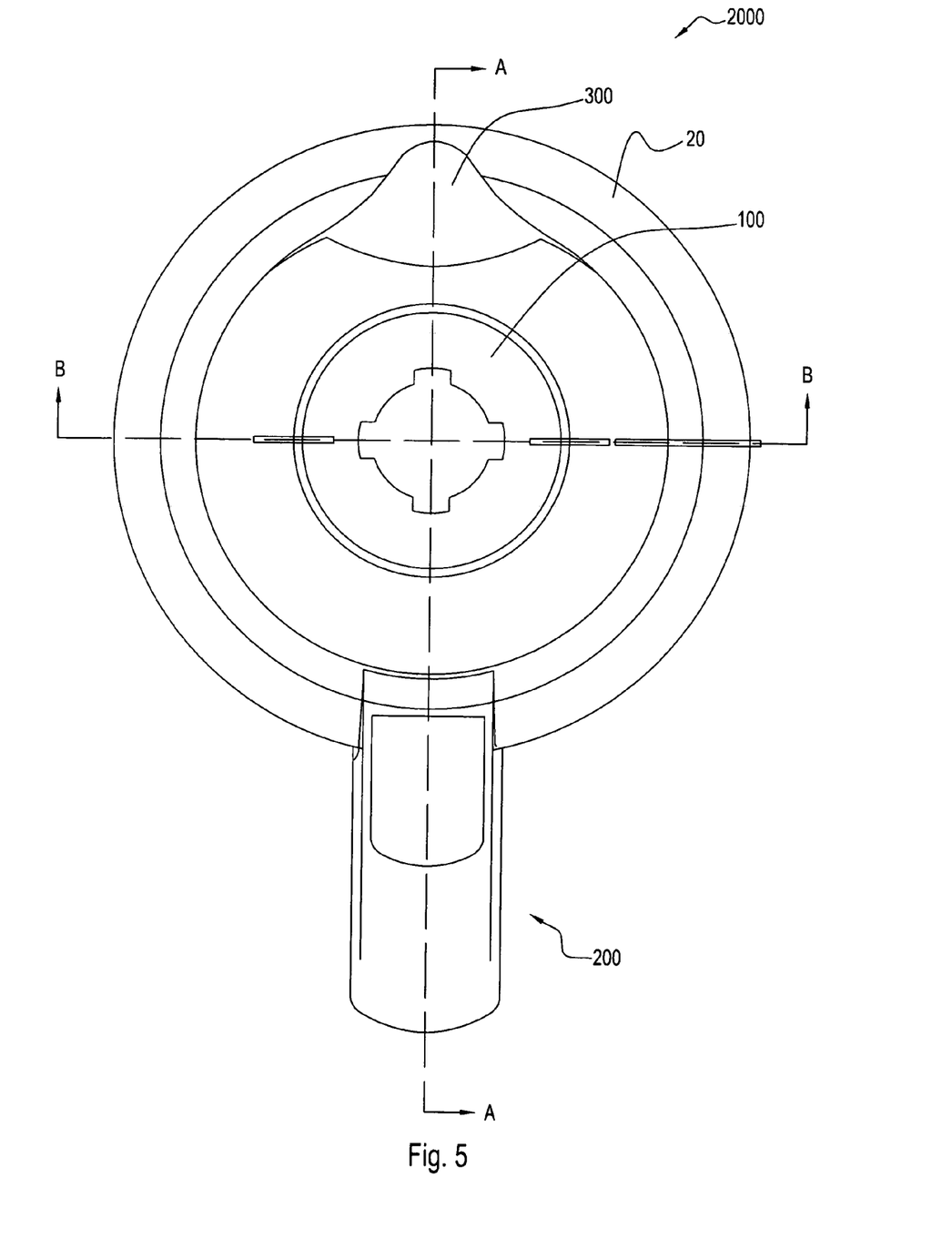
FIG. 5 is a top view of another alternate embodiment of the container of the present invention.

Referring to FIG. 4, an alternative embodiment of the container of the present invention is shown and generally represented by reference numeral 1000, with features that are similar to the features of container 10 being represented by the same reference numerals. In this embodiment, container 1000 also has a disk 400. Disk 400 is preferably vacuum brazed to the bottom of outer wall 30. This provides an advantage of a lower profile at the bottom of container 10 and simplifies the manufacturing process.

Referring to FIGS. 5 through 8, an alternative embodiment of the container of the present invention is shown and generally represented by reference numeral 2000, with features that are similar to the features of container 10 being represented by the same reference numerals. Lid 100 has a filling channel 1600, a filling ball 1650, a filling seat 1700 and a filling hole 1750.

Similar to the embodiments of FIGS. 1 through 4, filling ball 1650 has a specific gravity that allows it to float in filling channel 1600 when a liquid is introduced into the filling channel. When filling ball 1650 floats, it is raised above filling seat 1700. Thus, filling hole 1750 is opened and the liquid flows through filling channel 1600 into container 2000.

Container 2000 has a filling orifice 5500 positioned downstream from filling hole 1750. Preferably, filling orifice 5500 is offset from filling hole 1750 toward handle 200. Offsetting filling orifice 5500 from filling hole 1750 towards handle 200 minimizes the risk of any back flow of the liquid through filling channel 1600 when container 2000 is tilted for pouring.

Figure 6:
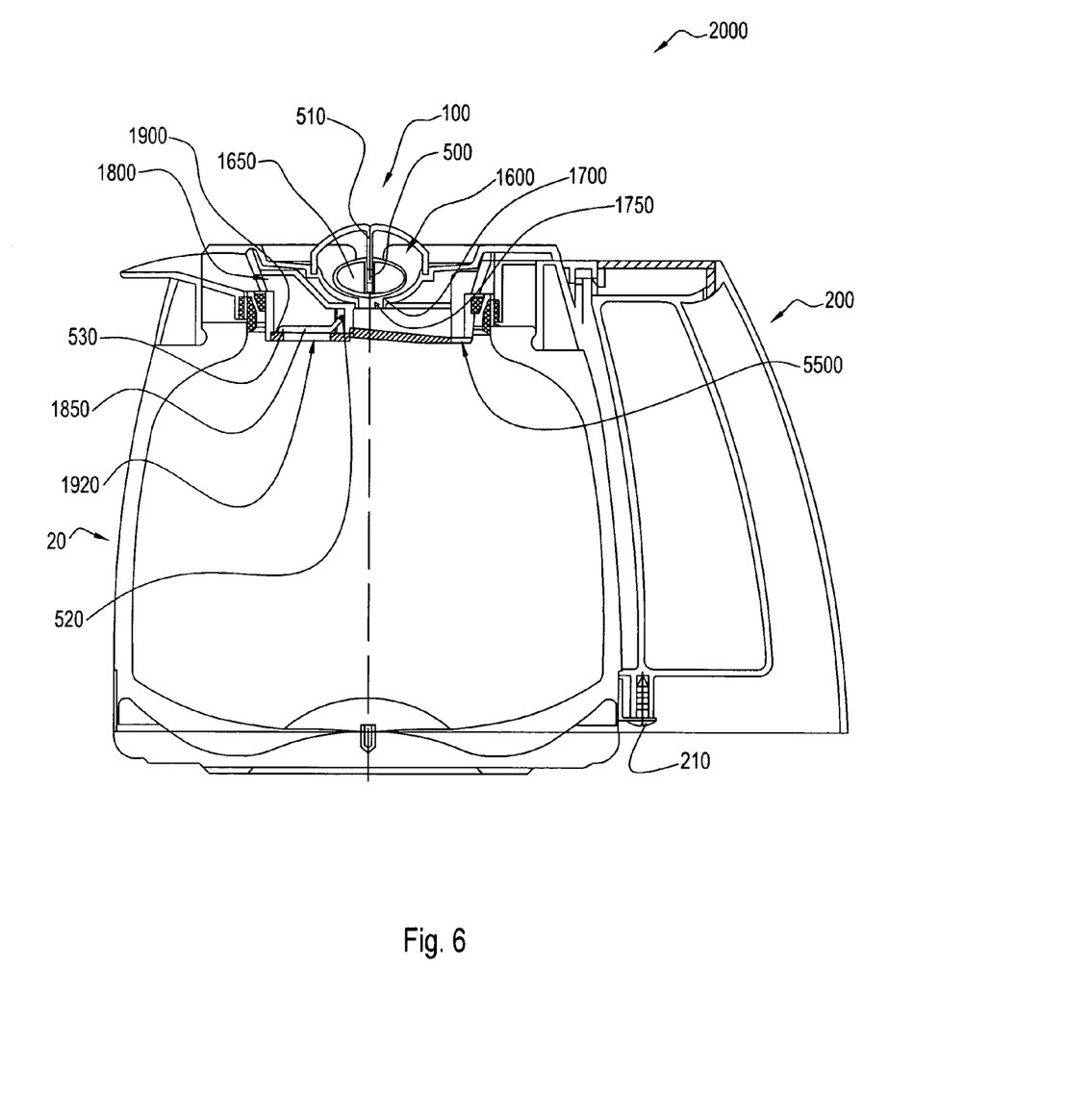
FIG. 6 is a cross-sectional view of the container of FIG. 5, taken along line A—A of FIG. 5.
Figure 7:
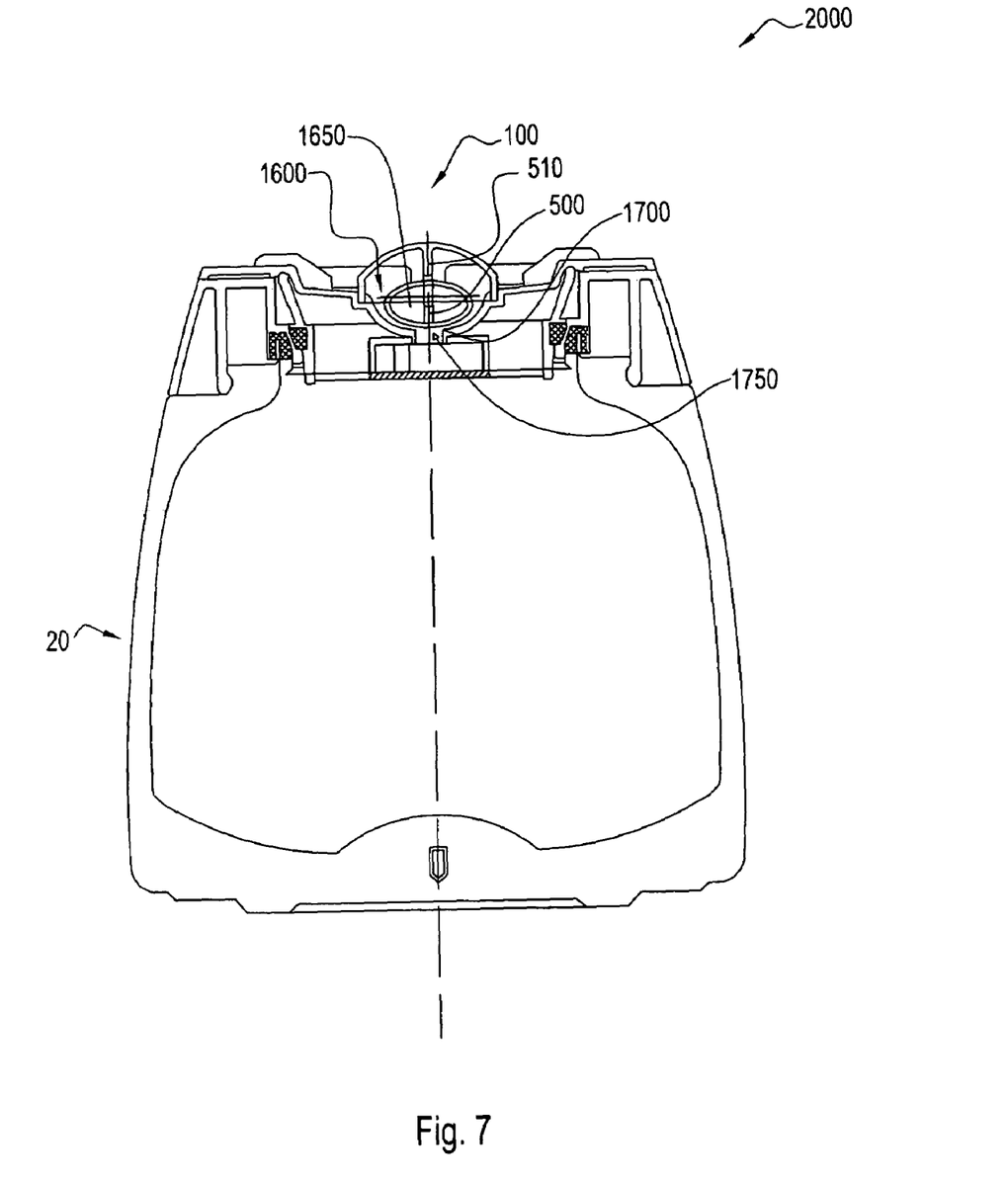
FIG. 7 is a cross-sectional view of the container of FIG. 5, taken along line B—B of FIG. 5.
Figure 8:
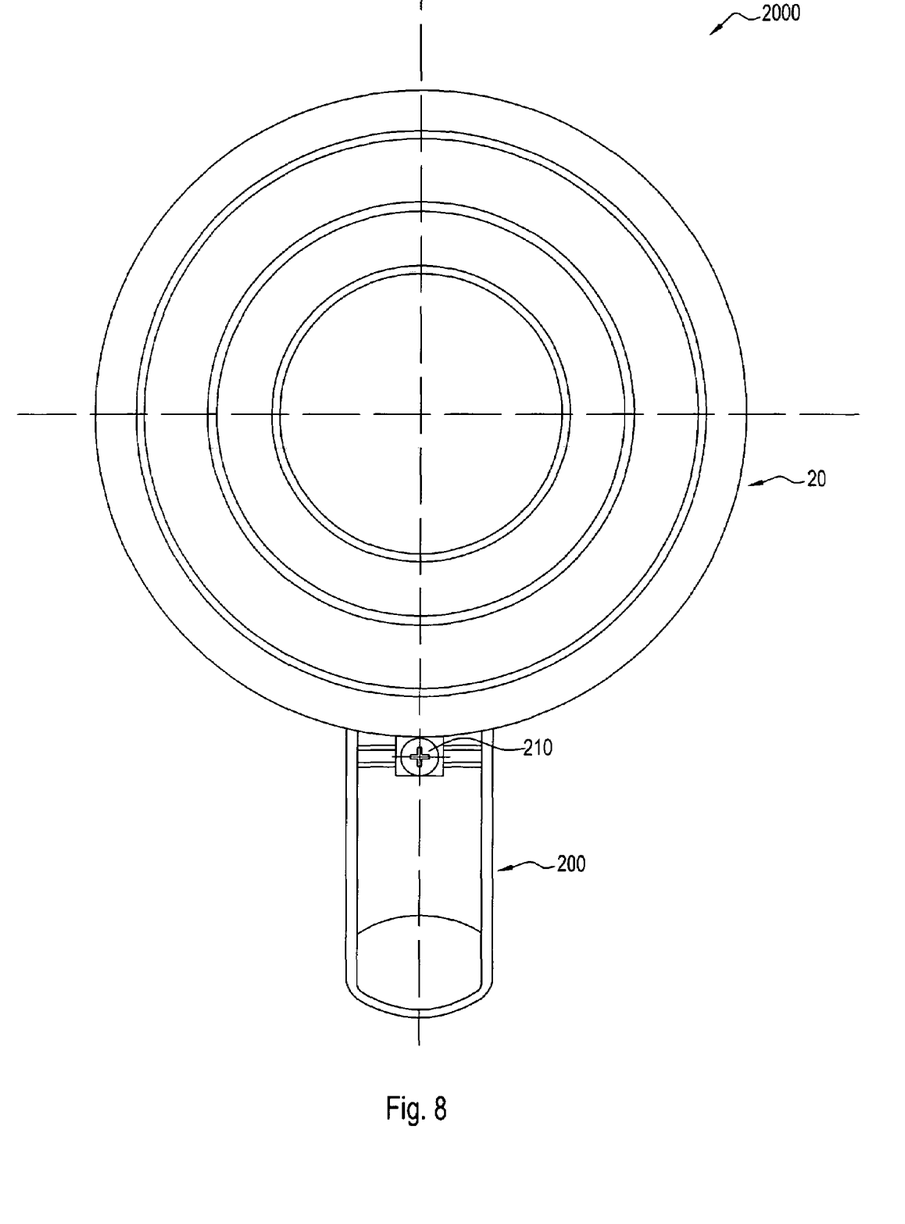
FIG. 8 is a bottom view of the container of FIG. 5.

Referring to FIGS. 6 and 7, filling valve 1650 is a ball with an oval shape. The oval shape of filling ball 1650 provides for a larger area for floatation without the need for increasing the height of the filling area. The larger area of floatation allows filling ball 1650 to sealingly engage a larger filling seat 1700 that allows for increased flow through filling hole 1750.

Filling ball 1650 has a channel 500 formed therein. Preferably, channel 500 is substantially centrally located in floating ball 1650. Lid 100 also has a floating projection or guiding member 510 extending downwardly towards floating ball 1650. Floating projection 510 is positioned above and aligned with channel 500 to allow the projection to slide into the channel. This permits vertical movement of floating ball 1650 when a liquid is introduced into filling channel 1600 but prevents or limits horizontal movement of the floating ball.

Referring to FIG. 6, lid 100 has a dispensing channel 1800, a dispensing valve 1850, a dispensing seat 1900, and a dispensing hole 1920. Dispensing valve 1850 is a flat valve having a first end 520 and a second end 530. First end 520 is pivotally connected to lid 100. Second end 530 is free to swing about the pivot point of first end 520. In this embodiment, dispensing valve 1850 has an L shape with first end 520 being positioned higher than second end 530.

When container 2000 is in an upright position, dispensing valve 1850 rests on dispensing seat 1900. Dispensing hole 1920 has a diameter that is smaller than the diameter of dispensing valve 1850 to allow a sealing engagement. Thus, heat loss through dispensing channel 1800 is prevented.

When container 2000 is tilted for pouring of the liquid, the force of gravity causes dispensing valve 1850 to swing about the pivot point of first end 520. Thus, dispensing valve 1850 is pivoted away from dispensing seat 1900 and dispensing hole 1920 is opened. The liquid can then flow through dispensing channel 1800.

It should be understood that the foregoing description is only illustrative of the present invention. Various alternatives and modifications can be devised by those skilled in the art without departing from the present invention.

Accordingly, the present invention is intended to embrace all such alternatives, modifications and variances as defined in the appended claims.

What is claimed is:

1. A container for holding a liquid comprising:
   a body having a hollow that defines an inner volume;
   a lid being sealingly secured to said body, said lid having a retaining ring and a cover, wherein said retaining ring is secured to said body, and wherein said cover is selectively secured to said retaining ring;
   a filling channel being formed in said lid for connection between said inner volume and atmosphere;
   a filling valve being operably connected to said filling channel;
   a dispensing channel being formed in said lid for connection between said inner volume and the atmosphere; and a dispensing valve being operably connected to said dispensing channel, wherein said filling valve has an actuated position that provides fluid communication between said inner volume and the atmosphere through said filling channel and a non-actuated position that provides fluid isolation between said inner volume and the atmosphere through said filling channel, wherein said dispensing valve has an actuated position that provides fluid communication between said inner volume and the atmosphere through said dispensing channel and a non-actuated position that provides fluid isolation between said inner volume and the atmosphere through said dispensing channel, wherein said filling valve is actuated by said liquid being filled into said inner volume, wherein said dispensing valve is actuated by tilting of the container, and wherein said filling and dispensing channels are formed through said cover.

2. The container of claim 1, wherein said cover is threadingly secured to said retaining ring.

3. The container of claim 1, wherein said retaining ring further comprises a spout in fluid communication with said dispensing channel.

4. The container of claim 1, wherein said dispensing valve is actuated by gravity when the container is tilted.

5. The container of claim 4, wherein said dispensing valve is a dispensing ball in said dispensing channel, and wherein said dispensing ball is movable between said actuated position in which said dispensing ball unseals said dispensing channel and said non-actuated position in which said dispensing ball seals said dispensing channel.

6. The container of claim 1, wherein said filling valve is a floating ball.

7. The container of claim 1, further comprising a vent that provides fluid communication between said inner volume and the atmosphere independent of actuation of said filling or dispensing valves.

8. The container of claim 7, wherein said body comprises an inner wall and an outer wall, and wherein said inner and outer walls are separated by a space having a vacuum therein.

9. The container of claim 1, wherein said body has a longitudinal axis, wherein said filling channel has a first end with a first opening and a second end with a second opening, and wherein said first opening is disposed farther away from said longitudinal axis than said second opening.

10. The container of claim 1, further comprising a spout in fluid communication with said dispensing channel.

* * * * *